July 18, 1933. G. R. BOTT 1,919,004

LATHE CENTER AND BEARING MEANS THEREFOR

Filed July 30, 1932

INVENTOR
George R. Bott,
BY
his ATTORNEY

Patented July 18, 1933 1,919,004

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

LATHE CENTER AND BEARING MEANS THEREFOR

Application filed July 30, 1932. Serial No. 626,634.

This invention relates to lathe centers and bearing means therefor, and more particularly to a "live" or rotating center for attachment to the tail stock of a lathe. Heretofore, such rotating lathe centers have been devised and provided with various different combinations of ball and roller bearings. It is a common objection in these prior art devices that the standard anti-friction bearing members occupy a disproportionately large space, so that the center is of unusually large diameter which, in addition to rendering the device costly to manufacture, is out of proportion and unsightly when mounted in operating position. It is also usually found that due to the arrangement of the several bearing units, there is a bad distribution of the load resulting in the development of looseness in the operation of the center at high speeds.

It is one of the important objects of my present invention to provide such an arrangement of the radial and thrust bearings in a device of this kind as will obviate the above noted disadvantages of the prior art efforts, and whereby a lathe center is produced of minimum length and outside diameter and in which adequate bearing means is provided for taking care of both the radial and cocking loads on the rotating center, as well as the axial thrust load.

It is a more particular object of the invention to provide for the purpose of taking the radial and cocking loads, a new type of cageless roller bearings arranged in suitably spaced apart relation axially of the rotating center. Each of these bearing units includes a comparatively large number of rollers of relatively small diameter with respect to the inner race surface and of such length relative to their diameter that they may be aptly referred to as needle rollers. Each set of these needle rollers operates within a body of lubricant of such viscosity and surface tension as to maintain the rollers, which are of specifically small weight, in circumferentially spaced apart relation, so that these rollers under normal loads will revolve as an entirety in non-rotating sliding relation to the inner and outer races and upon the development of abnormal radial or cocking loads, a few of the rollers subjected to the radial load of the rotating member will individually rotate about their respective axis. Thus frictional wear upon the anti-friction bearing elements and the race surfaces with which they engage is reduced to a minimum.

Economy in space is realized by interposing the axial thrust bearing between the spaced needle roller bearings. The length and proportionally large number of the rollers insures true alignment and the elimination of lost motion which are essential characteristics of an accurately operating lathe center. Owing to the extensive linear contacting surface of each needle roller with the race surfaces, maximum load carrying capacity is obtained in the smallest confined space.

It is a further object of my invention to provide in a lathe center of this type convenient means whereby the rotating center may be rigidly locked or held in its supporting housing while the point or nose of the center is ground to the true or operating axis.

With the above and other objects in view, the invention consists in the improved lathe center and bearing means therefor, and in the form, construction and relative arrangement of its several parts, as will be hereinafter more fully described, illustrated in the accompanying drawing and subsequently incorporated in the subjoined claims.

In the drawing wherein I have illustrated one simple and practical embodiment of my invention, and in which similar reference characters designate corresponding parts throughout the several views,—

Figure 1:
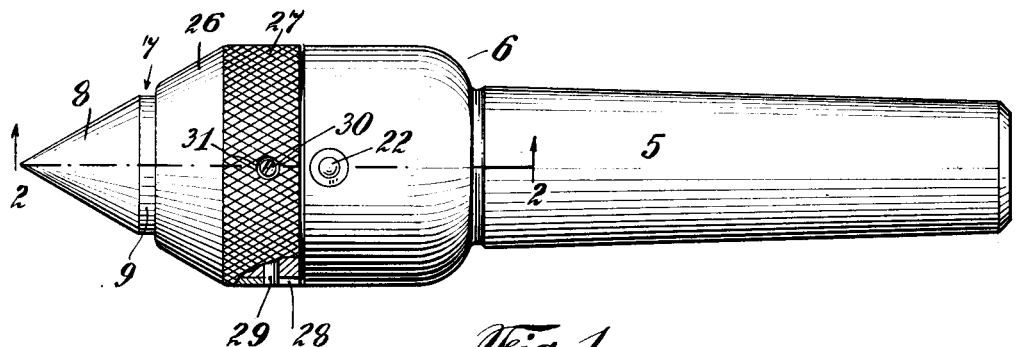
Figure 1 is a plan view partly in section showing a lathe center provided with my present improvements.
Figure 2:
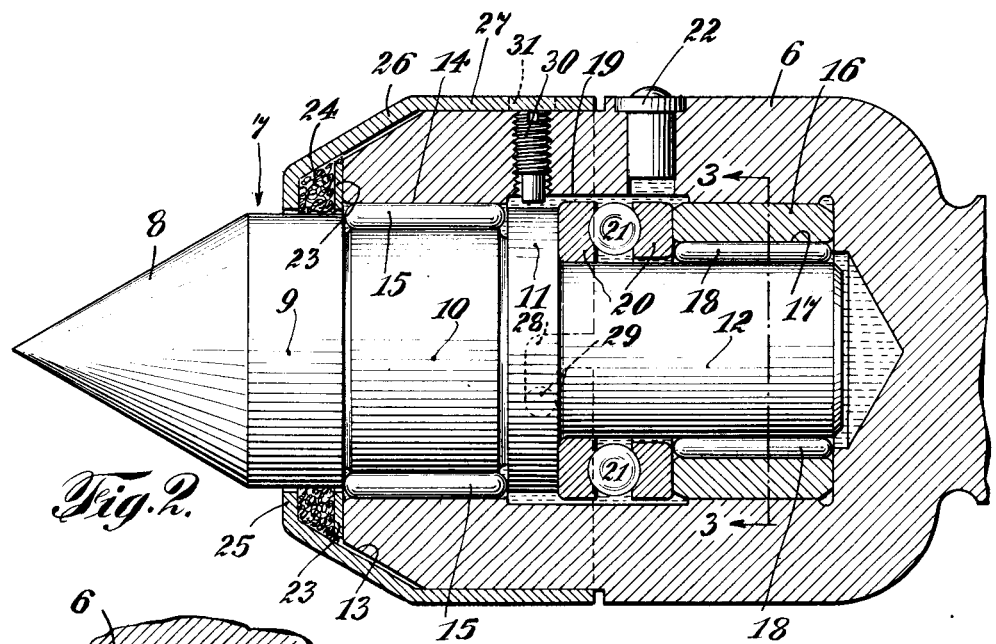
Fig. 2 is a longitudinal section taken substantially on the line 2—2 of Fig. 1, but showing the packing retaining cap locked to the body of the housing.

In the drawing, 5 indicates the usual tapering shank adapted to be suitably fixed in the tail stock of the lathe, the said shank being provided at one of its ends and preferably integrally formed therewith, with the hollow head 6 which constitutes the housing for the bearing means to be presently described. It may here be noted that the external diameter of this head or housing is but slightly greater than the end of the shank 5.

The center generally indicated at 7, is of substantial proportions relative to the head or housing 6 and therefore possesses maximum load sustaining capacity. As herein shown, this center is provided with the customary accurately ground conical work engaging nose or point 8 at one of its ends and at the inner or larger end thereof with the annular cylindrical portion 9. Adjacent to this portion 9, the center is formed with a diametrically reduced portion of considerable axial length which provides the inner race 10 for the forward set of bearing rollers. In spaced relation to this race 10 and integral with the intervening flange 11, the other end portion of the center is further reduced in diameter and provides a second inner race 12 for the rear set of bearing rollers.

The wall of the head or housing 6 at the open end thereof has an externally tapered surface indicated at 13, which is substantially parallel with the peripheral surface of the center point 8. Interiorly, the housing immediately adjacent the said open end thereof is provided with an outer race 14 for the forward set of bearing rollers which is of accurately predetermined diameter with respect to the inner race 10. Between these inner and outer race surfaces, the elongated bearing rollers 15 of small diameter relative to the race 10 are arranged. These rollers have line contact with the race surfaces throughout their length extending from the inner end of the part 9 of the center to the outer side of the flange 11 thereof.

For convenience in manufacture, the rear roller bearing is preferably provided with a separate outer race ring 16 which is accurately fitted into the inner end of the bore of the housing, which is preferably of the same diameter as the outer bearing race 14. The inner race surface 17 of the ring 16 is of accurately predetermined diameter with respect to the diameter of the race surface 12 on the inner end of the center, and between said race surfaces, the inner or rear set of needle bearing rollers 18 are interposed. Preferably, the individual rollers 15 and 18 of the two bearings are formed from ball bearing steel, hardened and provided with highly finished surfaces. While the ratio of diameter between the needle rollers and the inner bearing race may vary in accordance with the particular use or purpose to which the bearing is applied, in the present instance, I have illustrated such ratio as approximately ten to one. Preferably though not necessarily, this ratio between roller and race diameter is the same in the two sets of bearings.

Between the outer race surface 14 and the race ring 16 of the inner or rear roller bearing, the wall of the housing is preferably counterbored as indicated at 19 to accommodate the outer edges of the spaced race rings 20, between which the anti-friction balls 21 of a thrust bearing are interposed. One of the rings 20 bears against the forward end of the race ring 16 and overlaps the corresponding ends of the rollers 18, while the other ring 20 is in abutting engagement with the rear face of the flange 11 to rotate as a unit with the center.

A valved oil inlet 22 mounted in the wall of the housing communicates with the counterbore 19, and through this inlet a suitable grade of lubricating oil is supplied, and completely fills all of the space within said housing not occupied by the center and the bearing elements.

Against the outer end face of the housing 6, the annular washer plate 23 is engaged and overlaps the outer ends of the bearing rollers 15. A packing gasket 24 of felt or other suitable material and of appreciable thickness is disposed against the outer side of said washer plate, and has contact upon the peripheral face of the part 9 of the center. This gasket is held in place under suitable compression by the flange 25 at the smaller end of the tapered wall section 26 of a pressed metal cap 27 which is fitted over the end of the housing wall, said tapering section 26 extending in substantially parallel relation to the outer tapered end surface 13 of the housing wall. The wall of the cap 27 at its larger end is provided at opposite sides thereof with suitable bayonet slots as indicated at 28 to receive the projecting ends of pins or studs 29 fixed in the housing wall. There is also mounted in the wall of the housing a locking or set screw 30, the inner end of which projects into the counterbore 19. The wall of the cap 27 has an opening 31 therein which, in the position of said cap as shown in Fig. 1 of the drawing, when the studs 29 are in line with the open ends of the slots 28, permits of the insertion of the end of the screw driver whereby the screw 30 may be adjusted to bind the inner end of said screw upon the flange 11 of the center. Thus, the center can be rigidly held with relation to the housing against rotation while the work engaging point 8 thereof is being ground to assure true rotation of the center relative to the housing axis. After releasing the said screw 30 from bearing engagement on the flange 11, the cap 27 is then turned to its locked position with respect to lugs 29 whereby the outer end of said screw is covered by the wall of the cap.

Figure 3:
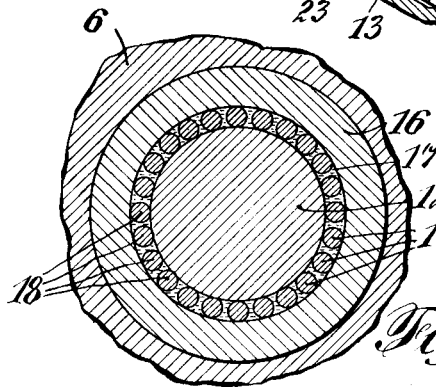
Fig. 3 is a diametrical sectional view taken on the line 3—3 of Fig. 2.
Figure 4:
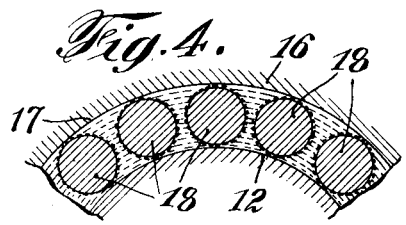
Fig. 4 is a detail fragmentary view on a magnified scale more clearly illustrating the operation of the needle roller bearings.

In the operation of a lathe center having bearing means of the above description, it will be evident that owing to the provision of the two sets of needle rollers providing a large number of axially extensive lines of contact with the race surfaces in each bearing, very accurate alignment, maximum load carrying capacity and the best possible distribution of the radial and cocking loads is realized. In normal operation, and when the thrust pressure of the combined load on the center point 8 is more or less equally distributed, the center will rotate with minimum friction around an axis accurately coinciding with the axes of the front and rear sets of bearings and the housing 6. In such operation, the needle rollers 15 and 18 of each bearing revolve as a unit or in their entirety between the inner and outer race surfaces. As shown in Figs. 3 and 4 of the drawing, the lubricating oil which is supplied under pressure to the interior of the housing, is of such viscosity or density with respect to the light weight of the individual rollers, that said rollers are maintained in separated or spaced apart relation, and this lubricant is of such surface tension that by reason of the resultant forces set up in the rotation of the center, the several small diameter rollers with the bodies of lubricant interposed therebetween move or revolve with a sliding, substantially frictionless, motion between the inner and outer race surfaces. It should be understood that, for the purpose of clarity, in Figs. 3 and 4 of the drawing, the spacing between the adjacent bearing rollers is greatly exaggerated.

Heavy pressure of the cutting tool upon the work, or an unbalanced distribution of the weight of the work piece about the axis of the center tends to cock or displace the center from its true normal axis of rotation, such movement resulting in radial pressures in opposite directions upon the rollers 15 and 18 in the front and rear sets of bearings as the center tends to rock about the bearing elements or balls 22 of the axial thrust bearing. Therefore, a few of the rollers in the front and rear bearings which are subjected to such radial load pressures, will then be rotated about their own individual axes at the same time as all of the rollers in each set move circumferentially between the inner and outer race surfaces. It will therefore be seen that a condition approaching the ideal is obtained in the use of my new roller bearing. Due to the many line contacts in each bearing and to the effect of lubrication, frictional wear is reduced to an absolute minimum, so that the said bearings will effectively operate without replacement and at the severest rotating speeds throughout the length of the life of the tool. Further it will be seen that the use of such rollers of small diameter and low weight, and without the use of a cage for holding the rollers in spaced apart relation, is particularly advantageous in a device of this character since it enables the use of a greater number of rollers and a supporting head or housing of very small diameter, while maintaining an adequate wall thickness for said housing. Also, the herein disclosed arrangement of these needle roller bearings with the thrust bearing likewise results in a supporting housing of minimum over all length. Thus the tool as a whole is proportioned to the very best advantage and when mounted in the lathe stock does not present any incongruous or unsightly appearance.

From the foregoing description considered in connection with the accompanying drawing, the construction, manner of operation and several advantages of my improved lathe center and bearing means therefor will be clearly and fully understood. It will be seen that I have devised an improved lathe center of this kind possessing very decided practical advantages as heretofore stated over similar devices previously used in the art. While in the accompanying drawing I have illustrated a construction and arrangement of the several detail features which I have found to be very satisfactory in the actual use of the invention, it is nevertheless to be understood that as to such details, the device may be embodied in various other alternative structural forms, and I accordingly reserve the privilege of resorting to all such legitimate changes therein as may be fairly incorporated within the spirit and scope of the invention as claimed.

I claim:

1. In a lathe center, a housing, a rotatable center having a shank extending within said housing, front and rear axially spaced apart, cageless radial type bearings interposed between said shank and the housing wall, each of said bearings comprising a plurality of small diameter rollers of low weight maintained in circumferentially separated relation to each other by fluid medium within the housing, the rollers of said spaced bearings being arranged in parallel relation to the shank axis, and a thrust bearing having a stationary part thereof directly engaged with the outer race member of one of said radial type bearings.

2. In a lathe center, a housing, a rotatable center having a shank extending within said housing, front and rear axially spaced apart, cageless radial type bearings interposed between said shank and the housing wall, each of said bearings comprising a plurality of small diameter rollers of low weight directly engaging said shank and maintained in circumferentially separated relation to each other by a fluid medium within the housing, and a thrust bearing arranged between said spaced radial roller bearings.

3. In a lathe center, a housing, a rotatable center having a shank extending within said housing, front and rear axially spaced apart, cageless radial type bearings interposed between said shank and the housing wall, each of said bearings comprising a plurality of elongated needle rollers of small diameter relative to the diameter of the shank section constituting the inner race for said rollers, the rollers in both bearings being of substantially the same length and providing a multiplicity of axially extensive lines of contact with said inner race surface, said needle rollers being of low weight and maintained in circumstantially separated relation to each other by a fluid medium within the housing.

4. In a lathe center, a housing, a rotatable center having a shank extending within said housing provided with axially spaced sections of relatively different diameters, front and rear cageless radial type bearings interposed between said sections of the shank and the housing wall, each of said bearings comprising a plurality of needle rollers providing a multiplicity of axially extensive lines of contact upon the periphery of the shank section and the ratio of the needle diameter to the diameter of the shank section engaged thereby being substantially the same in each of said bearings, said rollers being of low weight and maintained in circumferentially separated relation to each other by a fluid medium within the housing.

5. In a lathe center, a housing, a rotatable center having a shank extending within said housing, front and rear axially spaced apart, cageless radial type bearings interposed between said shank and the housing wall, each of said bearings comprising a plurality of elongated needle rollers of small diameter relative to the diameter of the shank section constituting the inner race for said rollers, and providing a multiplicity of axially extensive lines of contact with said inner race surface, said needle rollers being of low weight and maintained in circumferentially separated relation to each other by a fluid medium within the housing, said shank having an annular flange intermediate of its ends and a thrust bearing arranged between said flange and one of the radial roller bearings.

6. In a lathe center, a housing, a rotatable center having a shank extending within said housing, front and rear axially spaced apart, cageless radial type bearings interposed between said shank and the housing wall, each of said bearings comprising a plurality of elongated needle rollers of small diameter relative to the diameter of the shank section constituting the inner race for said rollers, and providing a multiplicity of axially extensive lines of contact with said inner race surface, said needle rollers being of low weight and maintained in circumferentially separated relation to each other by a fluid medium within the housing, said shank having an annular flange intermediate of its ends, a thrust bearing arranged between said flange and one of the radial roller bearings, and a locking screw adjustably mounted in the housing wall adapted to be frictionally engaged with said flange to releasably secure the center against rotation and in fixed relation to the housing.

7. In a lathe center, a housing, a rotatable center having a shank extending within said housing, front and rear axially spaced apart, cageless radial type bearings interposed between said shank and the housing wall, each of said bearings comprising a plurality of elongated needle rollers of small diameter relative to the diameter of the shank section constituting the inner race for said rollers, and providing a multiplicity of axially extensive lines of contact with said inner race surface, said needle rollers of low weight and maintained in circumferentially separated relation to each other by a fluid medium within the housing, said center having a conically formed work engaging end projecting from the open end of the housing, packing means surrounding and engaged with the center exteriorly of the housing, and a pressed metal cap member removably engaged with the housing wall having an annular tapering section thereof extending in substantially parallel relaton to the conical end of the center and terminating in an inwardly projecting flange engaging and holding the packing material under compression.

8. In a cageless roller bearing, the combination of relatively rotatable cylindrical bearing races, and a plurality of needle rollers interposed therebetween having a diameter normally in clearance relation to said race surfaces, together with a body of lubricant having such viscosity and surface tension as to maintain said rollers in circumferentially spaced apart positions and tend to cause said rollers to revolve as an entirety in non-rotating sliding relation to said race surfaces.

9. In a cageless roller bearing, the combination of relatively rotatable cylindrical bearing races, and a plurality of needle rollers interposed therebetween having a diameter normally in clearance relation to said race surfaces, together with a body of lubricant having such viscosity and surface tension as to maintain said rollers in circumferentially spaced apart positions and tend to cause said rollers to revolve as an entirety in non-rotating sliding relation to said race surfaces, said rollers adapted to have substantial contact throughout their length with each race surface, and a number of said rollers individually rotating about their respective axes when subjected to abnormal load pressure radial to the bearing.

10. In a cageless roller bearing, the combination of relatively rotatable cylindrical bearing races, and a plurality of needle rollers interposed therebetween of small diameter relative to the diameter of the inner race, and providing a multiplicity of axial lines of contact with the race surfaces extending substantially throughout the width of the bearing, the race surfaces being spaced apart a distance exceeding the diameter of the needle rollers, said rollers being of low weight and maintained in circumferentially separated relation to each other by a lubricant medium having such viscosity and surface tension as to prevent contact of the rollers with each other under the influence of centrifugal force and having a tendency to normally cause said rollers to revolve as an entirety in non-rotating sliding relation to the race surfaces, and a number of said rollers individually rotating about their respective axes when subjected to abnormal load pressure radial to the bearing.

11. In a lathe center, a housing, a rotatable center having a shank extending within said housing, anti-friction bearing means interposed between said center and the wall of the housing, and a locking screw adjustably mounted in the housing wall adapted to be frictionally engaged with a part of said center to secure the latter against rotation and in fixed relation to the housing.

12. In a lathe center, a housing, a rotatable center having a shank extending within said housing, anti-friction bearing means interposed between said center and the wall of the housing, said center having a conically formed work-engaging end projecting from the open end of the housing, packing means surrounding and engaged with the center exteriorly of the housing, and a pressed metal cap member removably engaged with the housing wall having an annular tapering section thereof extending in substantially parallel relation to the conical end of the center and terminating in an inwardly projecting flange engaging and holding the packing material under compression.

GEORGE R. BOTT.